G. A. MACBETH.
LAMP CONSTRUCTION.
APPLICATION FILED DEC. 23, 1914.
1,276,240.
Patented Aug. 20, 1918.
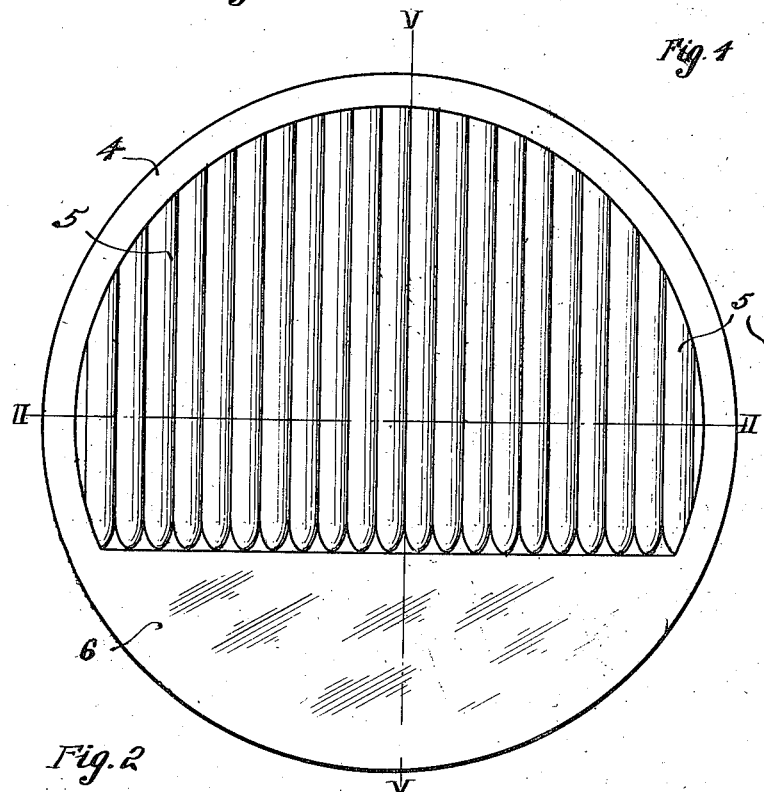
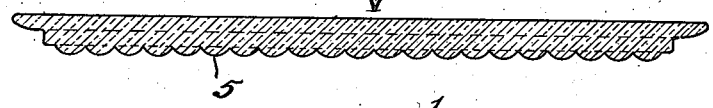
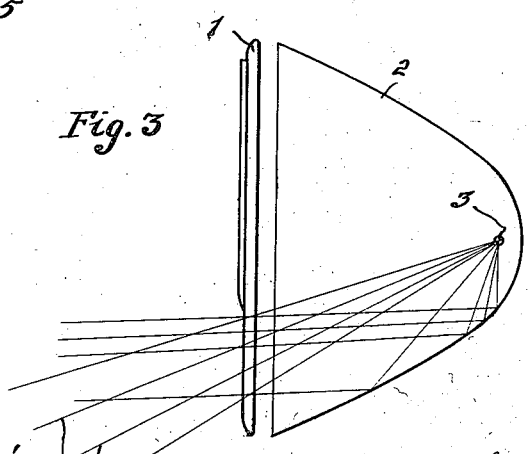

UNITED STATES PATENT OFFICE.

GEORGE A. MACBETH, OF PITTSBURGH, PENNSYLVANIA, ASSIGNOR TO MACBETH-EVANS GLASS COMPANY, OF PITTSBURGH, PENNSYLVANIA, A CORPORATION OF PENNSYLVANIA.

LAMP CONSTRUCTION.

1,276,240.  Specification of Letters Patent.  Patented Aug. 20, 1918.

Application filed December 23, 1914. Serial No. 878,660.

*To all whom it may concern:*

Be it known that I, GEORGE A. MACBETH, a citizen of the United States, residing at Pittsburgh, in the county of Allegheny and State of Pennsylvania, have invented certain new and useful Improvements in Lamp Constructions, of which the following is a specification.

The invention relates to lamps or lanterns, and particularly to those for use on vehicles and to the lens thereof. It has for its primary objects the provision of an improved construction wherein the light from the upper portion of the lens is dimmed; the provision of a construction of improved appearance, wherein the light from the upper portion of the lamp is refracted laterally in a plurality of directions, diffusing the light and avoiding the blinding glare of light so objectionable to observers along the path of travel of the vehicle; and the provision of a lens wherein the rays from the lower portion of the lens are allowed to diverge and illuminate the road in front of the vehicle. Certain embodiments of the invention are illustrated in the accompanying drawings, wherein—

Figure 1 is a face view of the lens, Fig. 2 is a section on the line II—II of Fig. 1, Fig. 3 is a diagrammatic side elevation view indicating the application of the invention to a lamp or lantern, Fig. 4 is an edge elevation of the lens of Fig. 1, Fig. 5 is a secion on the line V—V of Fig. 1, and Figs. 6 and 7 are vertical sections through modified forms of lens construction.

As indicated in Fig. 3, 1 is the lens, 2 is the lamp casing, and 3 is the source of illumination, it being understood that the lens is applicable to a number of different types of head lights or lanterns and that the one shown in Fig. 3 is merely illustrative of the method of use.

As indicated in Figs. 1, 2 and 5, the lens is provided with an edge portion 4 to be held by the retaining devices of the lamp and carries on one face a plurality of vertical refracting ridges or ribs 5, such ribs extending to a point below the horizontal center line of the lens. The portion 6 below the ridges 5 is plain. The function of the vertical ridges is to break up and diffuse the light passing through the upper portion of the lens, thus serving to avoid the blinding glare and render the lamp less objectionable to observers at the front of the vehicle and to the sides thereof. On the other hand the plain lower portion 6 permits the rays 7 (Fig. 3) to diverge laterally so that there is no decrease in the size or brilliancy of the field of illumination close to the vehicle. This relatively large bright field of illumination close to the vehicle is advantageous from the standpoint of the driver, and unobjectionable to observers at the sides of the vehicle, since the rays are directed downwardly and are at a level too low to reach the eyes of observers at the sides of the vehicle.

In order to secure a dimming effect, the lens is preferably of glass containing a small amount of coloring matter, preferably yellow, and as indicated in Fig. 5 the upper portion 8 of the lens is made very much thicker than the lower portion 6. The light from the upper portion of the lens is therefore considerably dimmed rendering the headlight unobjectionable to observers along the path of the vehicle while the thinness of the portion 6 permits of a bright illumination close to the vehicle where it will be of advantage to the driver and where it will be entirely unobjectionable to observers since the rays of light are at too low a level to reach their eyes as heretofore poitned out.

Fig. 6 illustrates a modification of the invention in which there is no thickening of the upper portion 10 of the lens which carries the ridges. The dimming effect upon the upper portion of this type of lens may be accomplished by using a thin coat of coloring matter upon such portion, leaving the lower portion uncolored.

Fig. 7 illustrates another modification producing the same result as the first construction since the upper portion 9 is thickened, such thickening occurring, however, on the reverse side of the glass. If desired the additional glass might be otherwise distributed, the only requirement being that the upper portion of the lens be thicker than the lower portion. It is immaterial which way the lens faces as the light effect is substantially the same when the ribs face toward the source of illumination as when they face away from it. In so far as the dimming effect due to the thickened and colored glass is concerned, it is immaterial whether the refracting ribs are omitted or modified, and various changes in shape might obviously be made to meet requirements.

What I claim is:

1. In combination in a lamp having a source of illumination, a lens having its upper portion provided with vertical refracting ridges and its lower portion plain, the upper portion of the lens carrying the ridges being thicker than the lower portion.

2. In combination in a lamp having a source of illumination, a lens having its upper portion of poorer light conducting capacity than the lower portion and having imposed thereon vertical refracting ridges which still further reduce the light conducting capacity of the upper portion, the lower portion of the lens being plain.

3. In combination in a lamp having a source of illumination, a lens having its upper portion thicker than the lower portion and having imposed thereon means for diffusing the light, the lower portion of the lens being plain.

4. In combination in a lamp having a source of illumination, a lens having its upper portion of poorer light conducting capacity than the lower portion and having imposed thereon light diffusing means, the said lower portion being plain.

5. In combination in a lamp having a source of illumination, a lens having its upper portion thicker than the lower portion and having imposed on the thicker portion means for diffusing the light.

In testimony whereof I have hereunto signed my name in the presence of the two subscribed witnesses.

GEO. A. MACBETH.

Witnesses:
JEROME E. CAPEN,
H. S. FULLER.